United States Patent
Baudisch et al.

(10) Patent No.: US 7,626,572 B2
(45) Date of Patent: Dec. 1, 2009

(54) SOAP MOBILE ELECTRONIC HUMAN INTERFACE DEVICE

(75) Inventors: Patrick Baudisch, Seattle, WA (US); Andrew D. Wilson, Seattle, WA (US); Michael J. Sinclair, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 611 days.

(21) Appl. No.: 11/454,677

(22) Filed: Jun. 15, 2006

(65) Prior Publication Data

US 2007/0290993 A1   Dec. 20, 2007

(51) Int. Cl.
*G09G 5/08* (2006.01)
(52) U.S. Cl. .................. 345/163; 345/156; 345/166
(58) Field of Classification Search ................ None
See application file for complete search history.

(56) References Cited

U.S. PATENT DOCUMENTS

| | | | | |
|---|---|---|---|---|
| 5,379,053 | A * | 1/1995 | Steinberg | 345/157 |
| 5,583,541 | A | 12/1996 | Solhjell | 345/163 |
| 5,945,981 | A | 8/1999 | Paull et al. | 345/180 |
| 6,016,138 | A * | 1/2000 | Harskamp et al. | 345/163 |
| 6,084,574 | A * | 7/2000 | Bidiville | 345/166 |
| 6,304,249 | B1 * | 10/2001 | Derocher et al. | 345/163 |
| 6,809,722 | B2 | 10/2004 | Mei et al. | 345/163 |
| 6,816,151 | B2 | 11/2004 | Dellinger | 345/167 |
| 7,006,074 | B2 | 2/2006 | Chesters | 345/156 |
| 2001/0035856 | A1 | 11/2001 | Myers | 345/156 |
| 2002/0118174 | A1 * | 8/2002 | Rodgers | 345/163 |
| 2003/0098848 | A1 | 5/2003 | Jzuhsiang | 345/163 |
| 2004/0046741 | A1 * | 3/2004 | Low et al. | 345/166 |
| 2005/0052291 | A1 | 3/2005 | Backman et al. | 341/22 |
| 2005/0219215 | A1 * | 10/2005 | Wu | 345/166 |
| 2006/0040712 | A1 | 2/2006 | Ansari et al. | 455/566 |

OTHER PUBLICATIONS

Web pages, TechBuilder, "Review: GO 2.4 GHz Cordless Optical Air Mouse," Nov. 11, 2005, 5 pages.

(Continued)

*Primary Examiner*—Alexander Eisen
*Assistant Examiner*—Matthew Yeung
(74) *Attorney, Agent, or Firm*—Westman, Champlin & Kelly, P.A.

(57) ABSTRACT

A new mobile electronic device, referred to as a soap, may be used to control electronic devices, external or internal to the soap, in an intuitive, convenient, and comfortable manner. For example, a soap may serve as an alternative to input devices such as a mouse. A soap device may include a core, and a hull that at least partially encloses the core. The core includes a tracking component capable of tracking movement relative to the hull. The soap input device also includes a transmission component configured to transmit a signal from the tracking component to a computing device, where it may control the position of a pointer and the use of a selector on a monitor. The hull may be soft and flexible, the core may be freely rotatable about at least one axis. The core has a shape such that tangentially applied pressure rotates the core relative to the hull. A user may therefore control an electronic device, simply by rolling and manipulating the soap.

17 Claims, 11 Drawing Sheets

OTHER PUBLICATIONS

Web pages, PC World Computing Center, "Wear Your Mouse—Or Your Whole PC," 2006, 2 pages.
P. de la Hiametter, P. Lukowicz and G. Troster, "Fingermouse: A Wearable Hand Tracking System," 2002, 2 pages.
Web pages, Gizmodo The Gadgets Weblog, "Samsung's Wearable Mouse," 5 pages, Mar. 31, 2006.
Byung Seok Soh, Yoon Sang Kim and Sang-Goog Lee, "Improving the Usability of a Wearable Input Device," 2 pages, 2003.

* cited by examiner

SOAP MOBILE ELECTRONIC HUMAN INTERFACE DEVICE

BACKGROUND

A substantial factor determining the productivity and utility users derive from their computers is the user-friendliness and convenience of the user's experience with a computer. Even a small difference in ease and convenience of the user interface can make a significant difference in the productivity of a user's experience. The adoption of graphical user interfaces (GUI's) presented a dramatic leap forward in ease of use, and allowed users to see a variety of different graphical indicators, icons, or buttons with one glance and select from among such graphical indicators by merely navigating a pointer to a desired graphical indicator and selecting it, for example.

Several different pointing input devices, over decades of experimentation and commercialization, have been used to control the pointer in a graphical user interface. The mouse has been the most popular input device for controlling a pointer and selector. Other pointer input devices have included styluses, trackballs, trackpads, and scrolling dials, for example. Some of these pointer control input devices are physically integrated with a keyboard or console, while some require physical contact with an output screen, while still others, such as a mouse, require physical contact or very close physical proximity to an external reference surface. These input devices have also occasionally been found to present issues of discomfort or repetitive stress when used intensively over a significant amount of time.

The discussion above is merely provided for general background information and is not intended to be used as an aid in determining the scope of the claimed subject matter.

SUMMARY

A new mobile electronic device, referred to as a soap, has been invented. A soap may serve as an alternative to a mouse input device, in one exemplary implementation. According to various illustrative embodiments, a soap device includes a core, and a hull that at least partially encloses the core. The core includes a tracking component capable of tracking movement relative to the hull. The soap device also includes an output component configured to provide a signal from the tracking component to an electronic device, which may be by wireless transmission to an external device, or to an electronic device internal to the soap. According to one illustrative embodiment, the hull is soft and flexible, the core is rigid and freely rotatable within the hull about at least one axis, and the core has a shape such that pressure tangentially applied to the hull, such as by rolling or kneading the soap similar to how one might roll a wet bar of bath soap in one's hand, rotates the core relative to the hull. A user may therefore control an electronic device simply by rolling and manipulating the soap. For example, in one illustrative implementation, a soap may be used to control a pointer on a monitor of a computing device, and perform input functions typical of a mouse, such as point, click, and scrolling functions, simply by rolling and manipulating the soap.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments of a soap can be implemented in a variety of ways. The following descriptions are of illustrative embodiments, and constitute examples of features in those illustrative embodiments, though other embodiments are not limited to the particular illustrative features described.

A soap provides advantages over existing input devices, for example as a mobile user interface pointer control device, in place of a mouse. A soap does not need to be held on, and moved relative to, an external surface, but instead may be used to perform the functions of a mouse while being held and controlled in one hand in mid-air, for this illustrative example. For a pointer control soap implementation, this provides a key advance for removing the computer and information technology experience from being restricted to a desktop or to immediate physical contact with a mobile computing device. For this or any other implementation example, a soap empowers the user to freely control computing or other electronic devices anywhere in her presence without having to think about either physical contact with the devices or physical contact of her input device with an external surface. As a couple of examples, this facilitates the transition of the computing device usage experience to one with a very large monitor that might be across the room from a user, which may provide a television or theater type experience in an integrated format with a computer game or Internet experience, along with other computing device applications.

A user may continue to roll a soap in one direction indefinitely, simply by rolling it around and around in her hand, as one might do with a bar of bath soap. For the example of a pointer control soap for a computing device, the soap input device thereby enables a user to scroll continuously or perform an indefinitely long pointer position movement with a single, uninterrupted motion.

Figure 1:
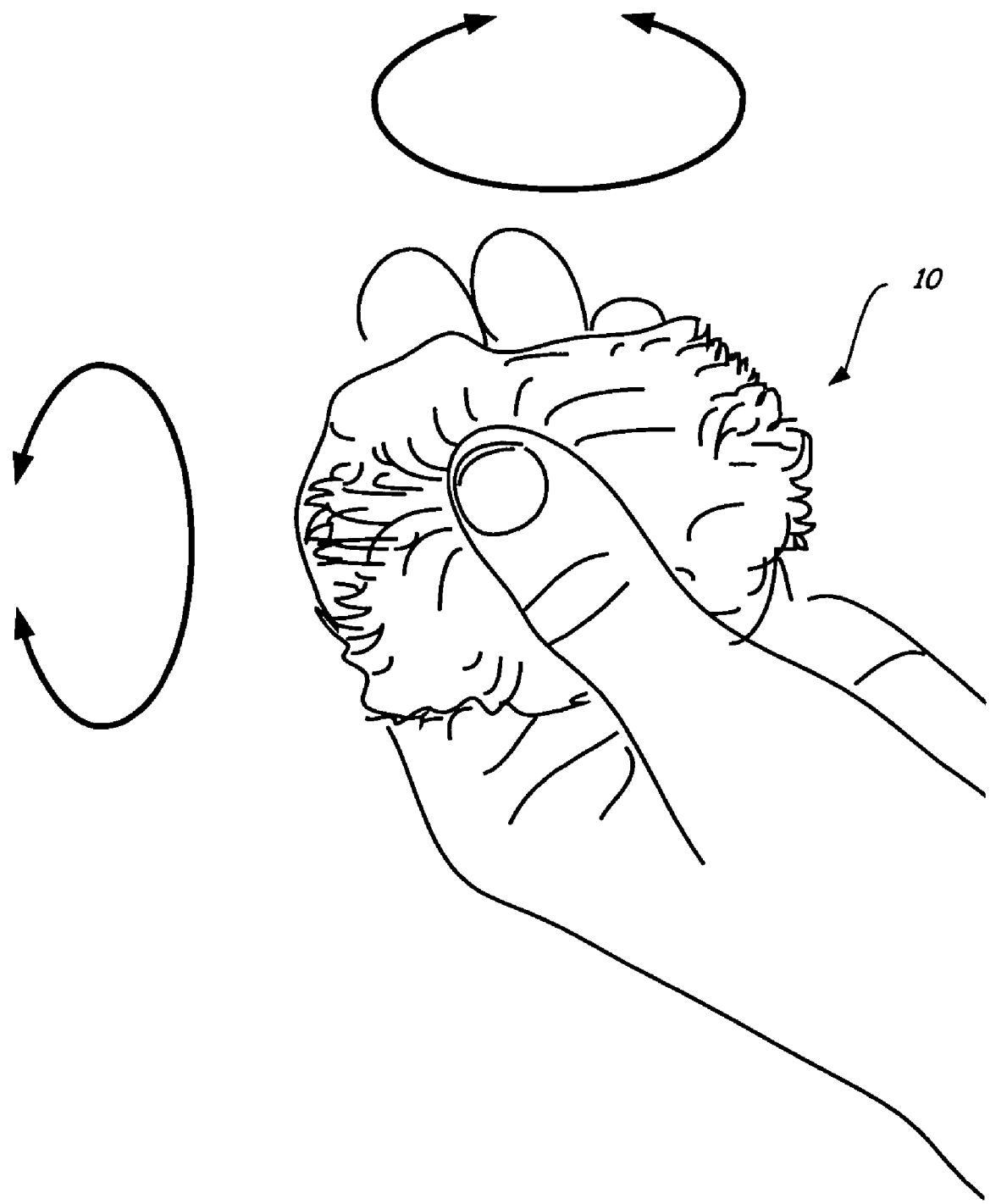
FIG. 1 depicts a perspective view of a soap device in use, according to an illustrative embodiment.
Figure 2:
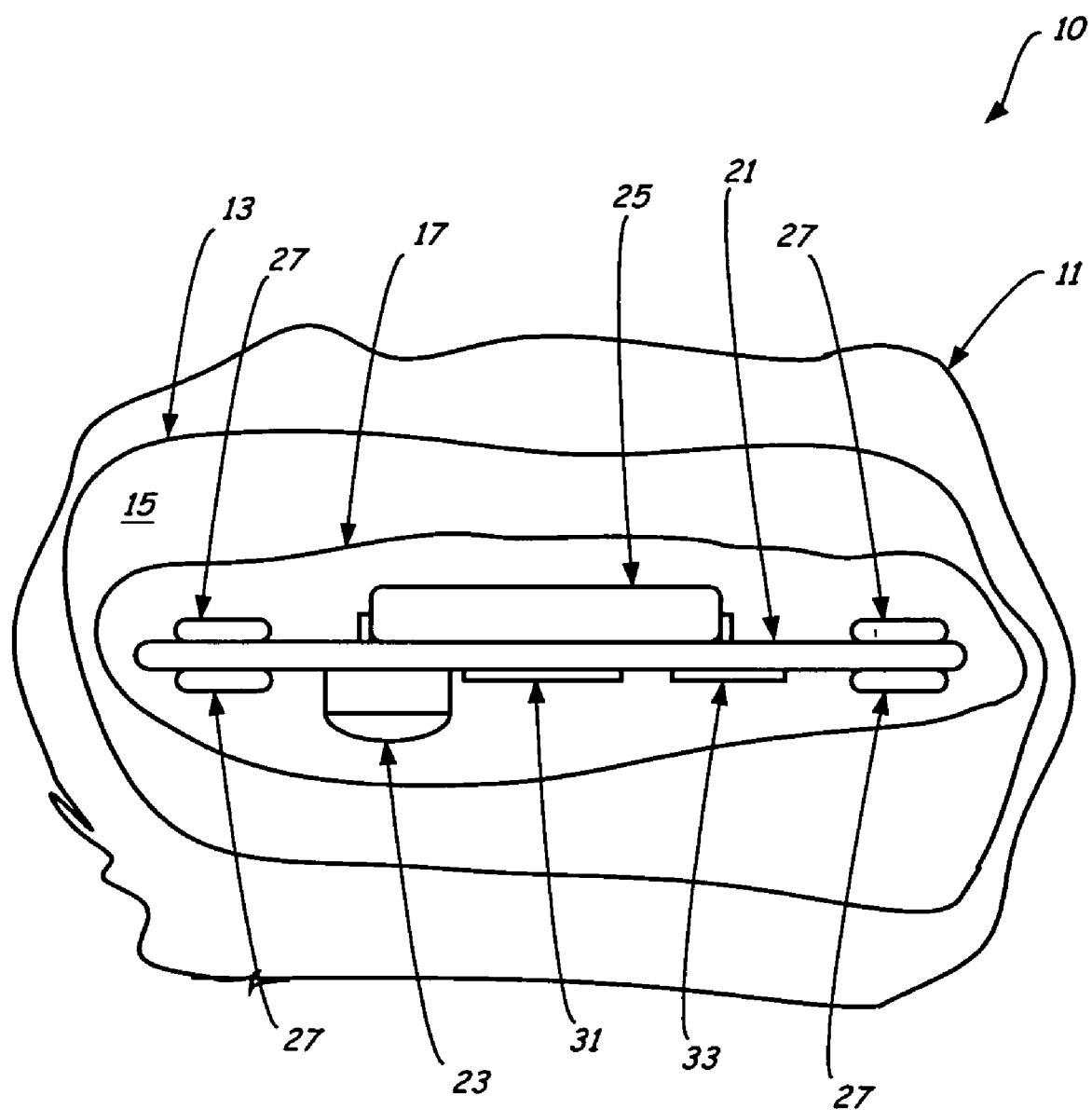
FIG. 2 depicts a partial cutaway, side view, cross-sectional diagram of a soap device, according to an illustrative embodiment.
Figure 3:
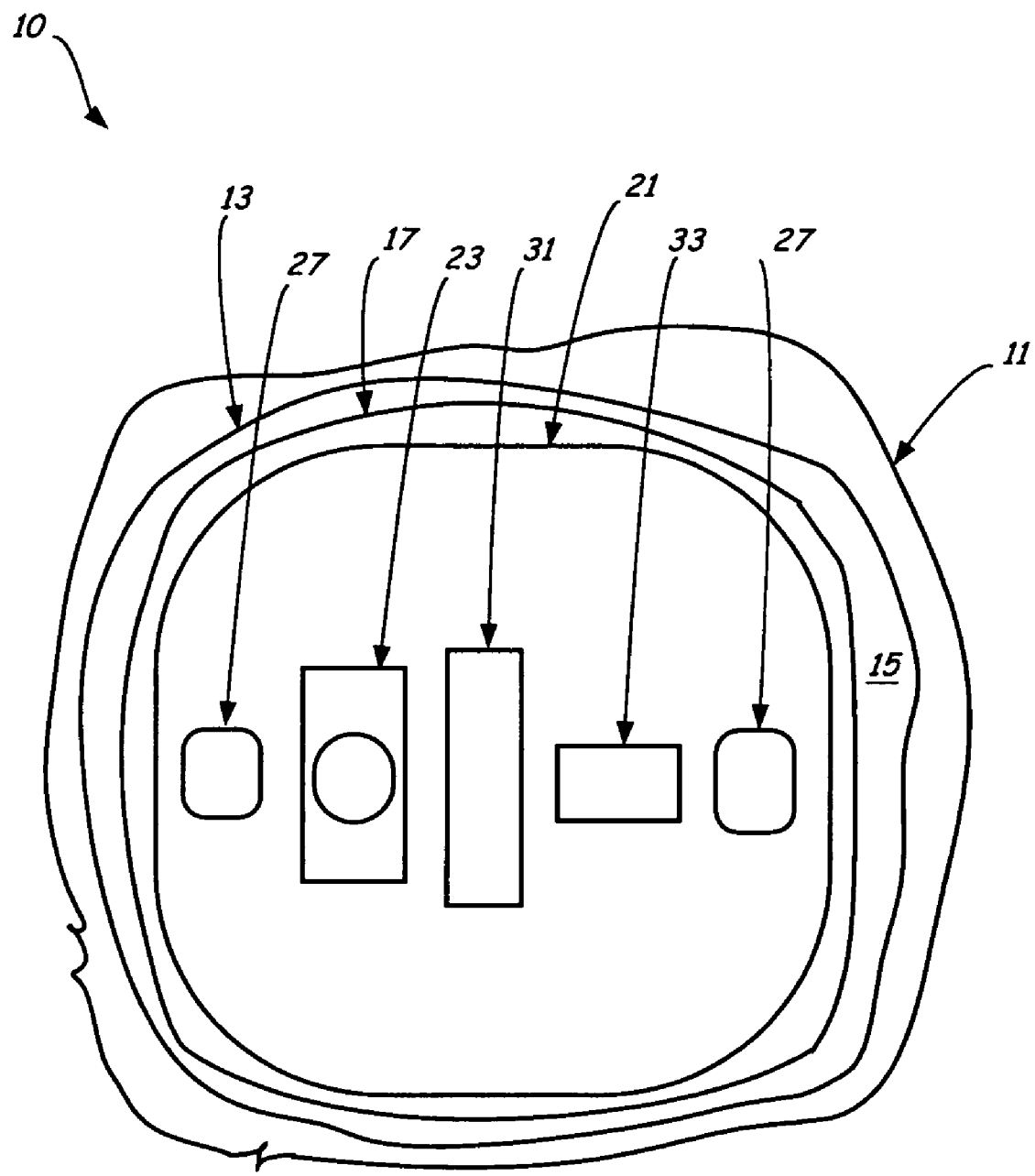
FIG. 3 depicts a partial cutaway, bottom view, cross-sectional diagram of a soap device, according to an illustrative embodiment.

FIGS. 1-3 may be considered together to exemplify certain features of a soap device 10 according to one illustrative embodiment. FIG. 1 depicts a perspective view of a soap device 10 being used by a user, according to an illustrative embodiment. FIG. 2 depicts a partial cutaway, side view, cross-sectional diagram of soap input device 10, according to an illustrative embodiment. FIG. 3 depicts a partial cutaway, bottom view, cross-sectional diagram of a soap input device 10, according to an illustrative embodiment. The devices depicted in these figures are described below with reference to implementation of a soap as a computer input device, to provide one particular illustrative example out of the different types of devices and functions for which a soap can be implemented, with the understanding that other implementations of a soap are not limited to these particular examples.

As illustratively depicted in FIG. 1, a user holds a soap 10 in his hand and may manipulate it about one or two axes, in different illustrative embodiments. By making a regular rolling or rubbing motion with his hand, the user can manipulate the inner core of soap 10 to rotate continuously about either of the two axes, in this illustrative embodiment. This type of interaction, which may be referred to as a soap interaction, keeps the outer hull 11 in roughly stationary contact with the user's hand, while the core 17 is being turned about. A user may also drag the outer hull 11 in one direction on one side of soap 10 and in the other direction on the other side of soap 10 while keeping the core 17 in roughly the same orientation, accomplishing a similar effect as with the soap interaction; this is referred to as a belt interaction. A user may also hold the soap 10 in a constant grip while pressing the outer hull 11 in different directions over the sensor 25; this is referred to as a joystick interaction, since it treats the outer hull 11 over the sensor 25 in an analogous manner to a joystick.

Figure 4:
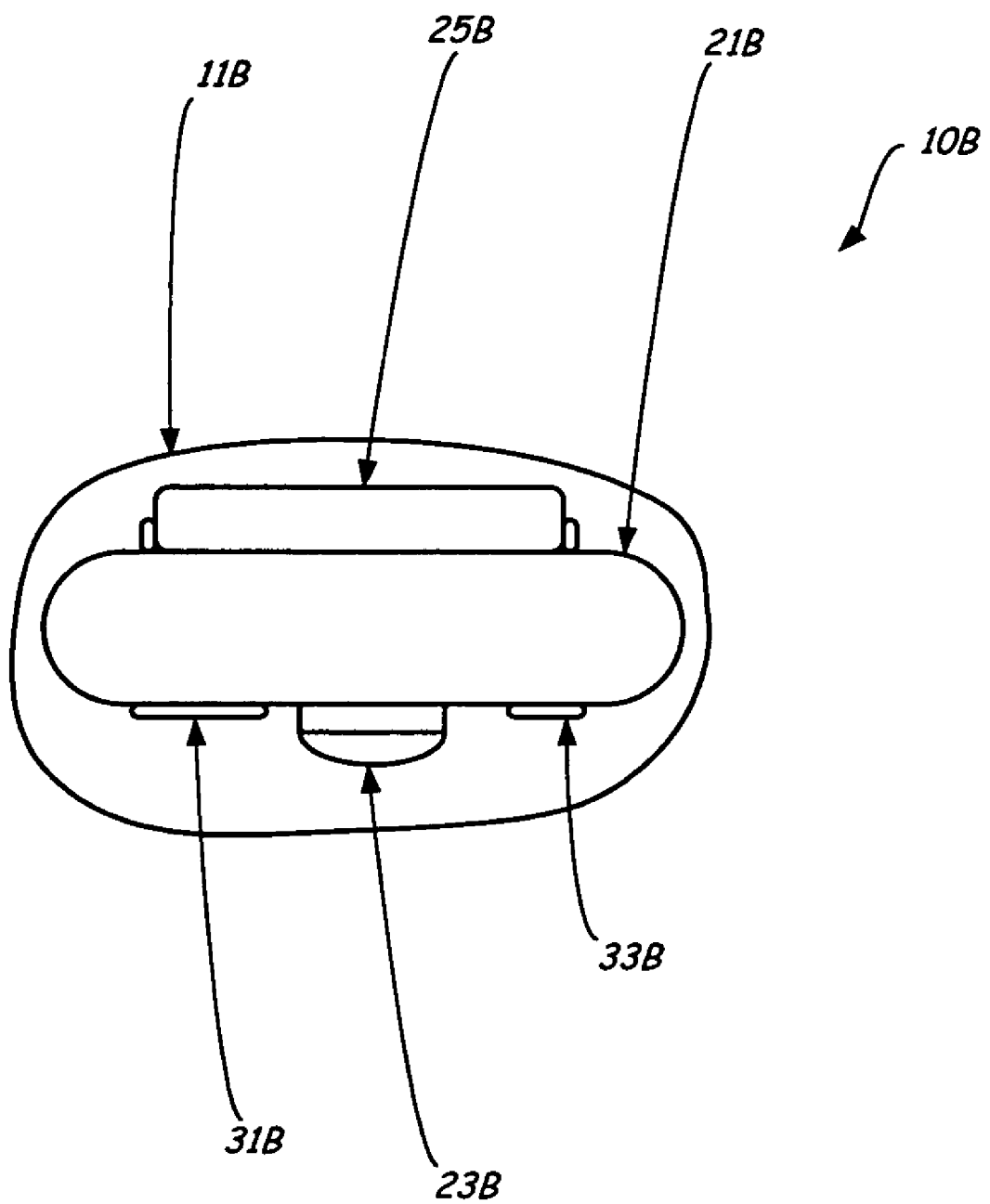
FIG. 4 depicts a partial cutaway, side view, cross-sectional diagram of a soap device, according to an illustrative embodiment.

As depicted in FIGS. 2 and 3, soap input device 10 includes an inner, first hull 17, a second hull 13, an outer hull 11, and a core 21. Core 21 includes an optical sensor 23 that functions as a tracking component capable of tracking movement relative to one of the hulls, such as the outer hull 11. The core 21 is at least partially enclosed by the first hull 17, in this illustrative embodiment. In other embodiments, soap 10 may include only a single hull, that partially encloses core 21 and that functions as the reference surface for optical sensor 23 to track its movement relative to. The full complement of components depicted in the soap 10 according to the illustrative example in FIGS. 2 and 3 are not all necessary in other embodiments; FIG. 4, for example, demonstrates a simpler structure for a different implementation of a soap, as described further below.

As depicted in FIGS. 2 and 3, core 21 also includes processor 31, configured to perform processing and control functions for soap 10; power component 25, configured to provide the power for soap 10; and wireless transmitter 33, configured to transmit a signal from the optical sensor 23 to a computing device, such as to convey the relative motion of optical sensor 23 relative to its reference surface on outer hull 11, in this illustrative embodiment. In other embodiments, the soap may control an internal device, and does not require a transmitter; an illustrative embodiment of this is described further below with reference to FIG. 8.

As depicted in FIGS. 2 and 3, soap 10 also includes pressure sensors 27; and lubricant 15 contained between first hull 17 and second hull 13, in this illustrative embodiment. First hull 17 and second hull 13 are flexible and may be elastic, and outer hull 11 is soft and flexible, in this illustrative embodiment. Other embodiments do not require pressure sensors, or a lubricant, or separate first and second hulls, which are included in the present illustrative example to indicate a few optional features that may be included in a soap. An example of a soap not using these optional features is provided in FIG. 4, discussed further below.

Core 21 has a relatively wider dimension along its length and width, as seen in FIG. 3, while it has a fairly narrow height, as seen in FIG. 2, making it roughly lentil-shaped. The difference in dimensions enables the core 21 to be rotated around and around, about one or two axes, within first hull 17 by a user rolling or kneading the soap 10 with one hand. Optical sensor 23 then tracks changes in its position relative to first hull 17, which acts as a flexible tracking reference, in a manner analogous to the optical sensor of a mouse tracking its position relative to a mousepad. In another implementation, not depicted in the figures, a soap could have a greater length than width and be configured to rotate about only one axis, which may be preferred for certain applications.

Optical sensor 23 may include a light source, such as a red LED, for example, as well as a detector optimized for reading the reflection from the light source on a reference surface, in this illustrative embodiment. Optical sensor 23 has a focal length at least equal to a distance between the optical sensor 23 and the outer hull 11, in this illustrative embodiment. While an optical sensor is provided in this illustrative example, other implementations may use any type of surface tracking device, such as a mechanical tracker, a laser, a camera, or other option. In this embodiment, the first hull 17, the lubricant 15, and the second hull 13 are composed of materials that are effectively transparent to the optical sensor 23. For example, the first hull 17 and second hull 13 may be composed at least in part of polyurethane, and the lubricant composed at least in part of oil, in the present illustrative embodiment. The signal used by optical sensor 23 then uses the inner surface of outer hull 11 as its reference surface, and passes through first hull 17, the lubricant 15, and the second hull 13 well enough not to interfere with its reliable effectiveness in sensing outer hull 11 as its reference surface, in this illustrative embodiment.

As soap 10 is manipulated in the user's hand, then, the optical sensor 23 is moved relative to the inner surface of outer hull 11, determining the signal generated by optical sensor 23. Incidentally, in this illustrative embodiment, the focal length for the optical sensor 23 is typically longer than the focal length of the optical sensor of an optical mouse, to optimize for the longer typical displacement between the soap's optical sensor and its reference surface, versus the typical operational displacement between a mouse's optical sensor and a mousepad.

FIG. 4 depicts a partial cutaway, side view, cross-sectional diagram of a soap input device 10B, according to an illustrative embodiment. This embodiment is also consistent with the soap 10 depicted in FIG. 1, but constitutes a simpler embodiment than the soap 10 of FIGS. 2 and 3. Soap 10B of FIG. 4 includes a single hull 11B, a core 21B, a power source 25B, a tracking sensor 23B, a control processor 31B, and an output component 33B. Like soap 10, soap 10B may be manipulated to make its core rotate about two axes. Core 21B freely rotates within the single hull 11B, which provides a low friction, well-tracked reference surface on its interior, and a pleasing, grippable exterior surface. Output device 33B may be a wireless transmitter to communicate output from the manipulation of the soap 10B to an external computing device or other electronic device; in other embodiments, output component 33B may include its own self-contained device interior to soap 10B, which the user controls by controlling the soap 10B in which it is embedded. For example, output component 33B may comprise a radio, a GPS system, or a mobile telephone, for example, and may include data storage, control circuitry, audio speakers, a microphone, or any other subcomponents needed for operation of the internal device, which is controlled by manipulation of soap 10B.

Figure 5:
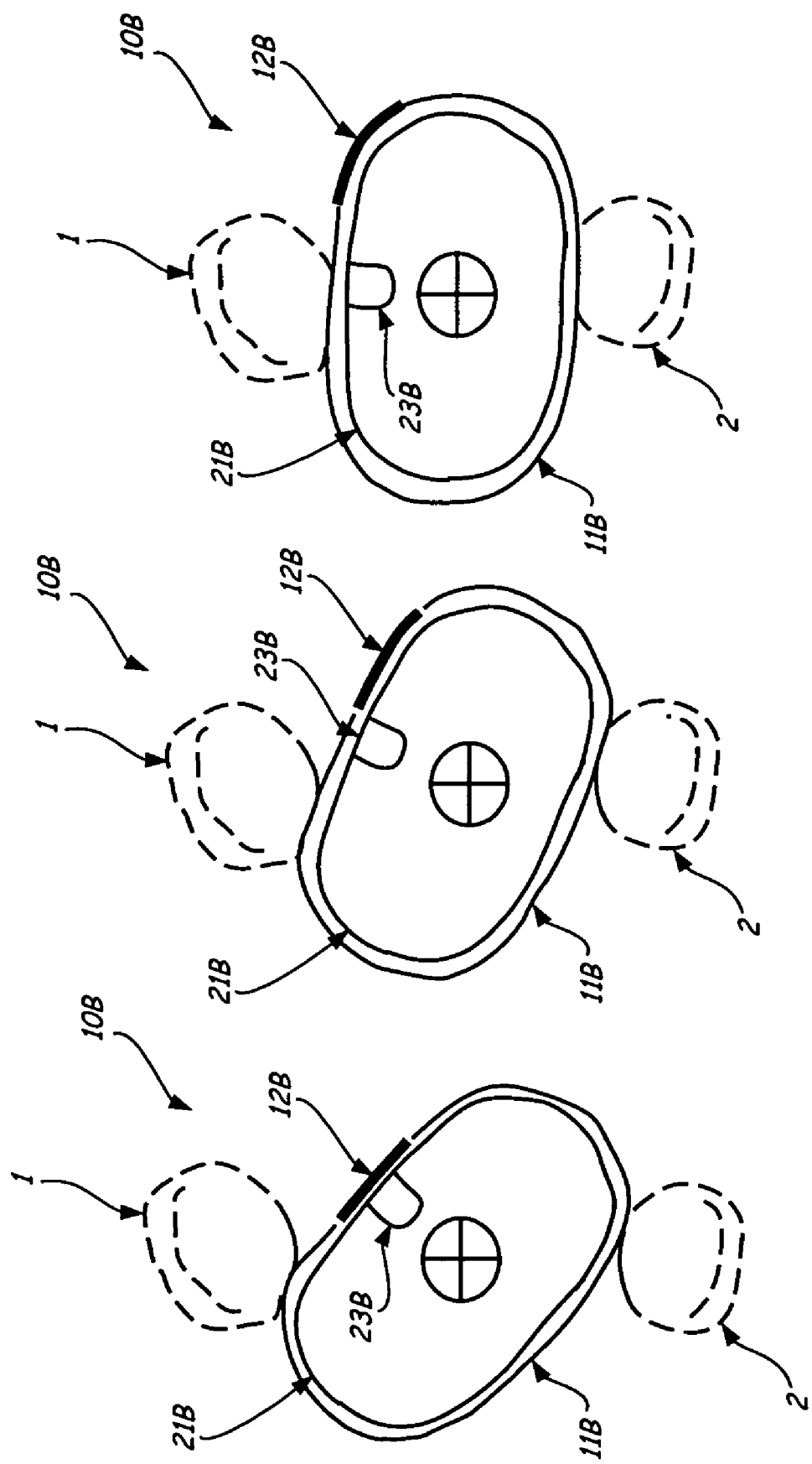
FIG. 5 depicts a partial cutaway, long view, cross-sectional diagram of a soap device in a time-lapse series depicting functional usage, according to an illustrative embodiment.

FIG. 5 depicts a partial cutaway, long view, cross-sectional diagram of a soap input device 10B in a time-lapse series depicting functional usage, according to an illustrative embodiment. FIG. 5 illustrates the mechanics of operating a soap, and is also applicable to the illustrative embodiments of soap 10 in FIGS. 1-3, other than the readily apparent differences in structural detail. As a user applies pressure using thumb 1 and opposing finger 2, the core 21B rotates to evade the pressure. At the same time, friction between fingers 1 and 2 and hull 11B holds hull 11B in place, resulting in relative motion between hull 11B and core 21B.

Hull portion 12B moves relative to sensor 23B, demonstrating the relative movement of the hull 11B, forming the tracking reference for sensor 23B, as soap 10B is manipulated. Hull portion 12B is poised directly above sensor 23B just before the manipulation depicted in FIG. 5 begins, as in the panel at left. As the user presses soap 10B at an angle from on center, hull portion 12B is moved away from sensor 23B, as depicted in the panel at center, and then more substantially after the user manipulation continues to progress, as depicted in the panel at right. Hull portion 12B is selected from among hull 11B merely to depict the tracking motion, but has no special significance apart from the rest of hull 11B; the interior of hull 11B is similarly moved relative to sensor 23B during other user manipulations, causing sensor 23B to provide a signal responsive to the tracked relative motion of hull 11B.

Figure 6:
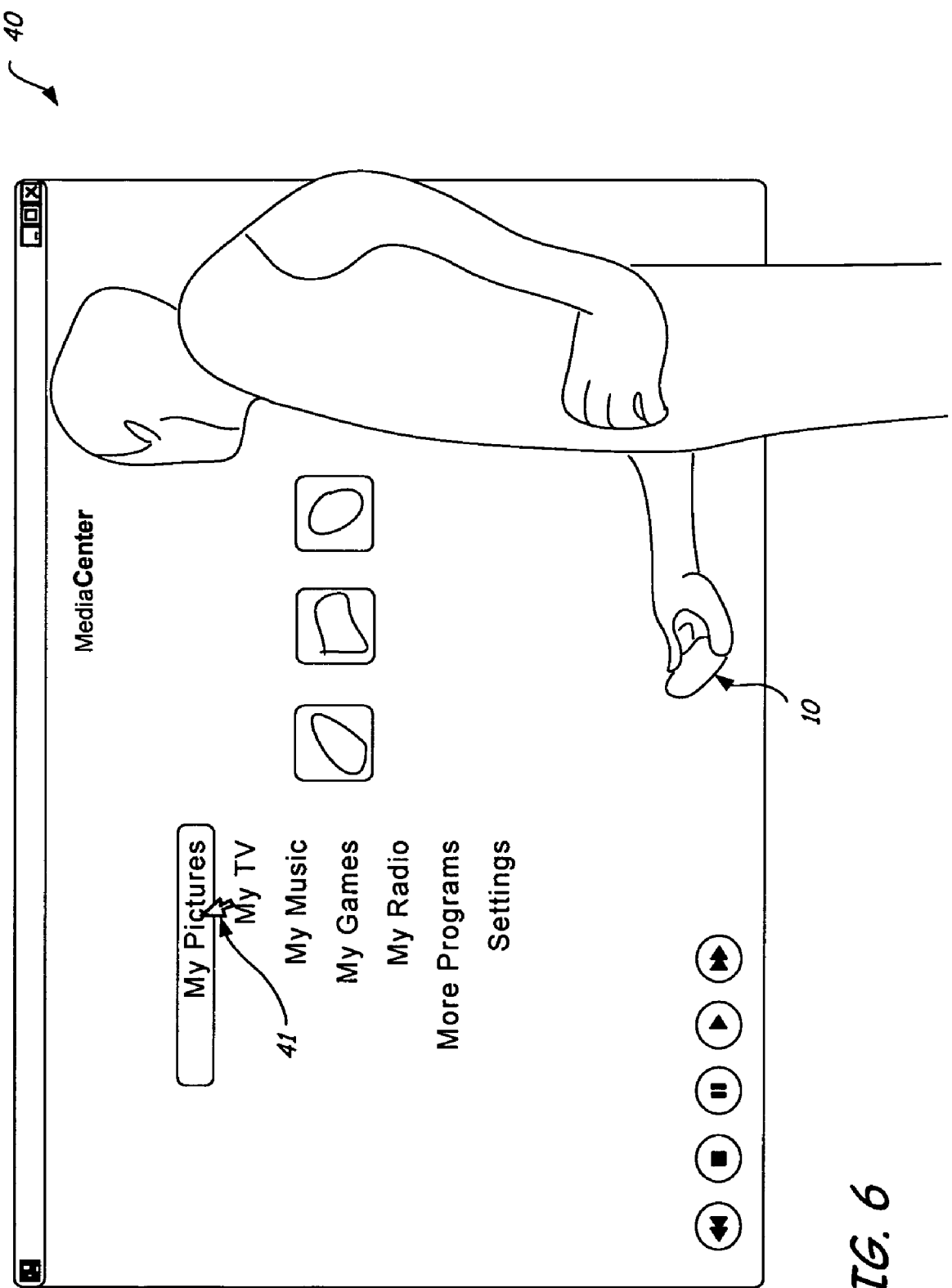
FIG. 6 depicts a perspective view of a soap device and a monitor in use, according to an illustrative embodiment.

FIG. 6 depicts a perspective view of a soap input device and a monitor in use, according to an illustrative embodiment. As depicted in FIG. 6, the changes in position of optical sensor 17 relative to its reference surface inside outer hull 11 are communicated to a computing device, and are used to determine the position of a pointer 41 of the graphical user interface displayed on wall-mounted monitor 40, as a function of the changes in position of optical sensor 17. In another mode of use or another embodiment, changes in the position of the optical sensor 17 relative to its reference surface may determine changes in velocity of the pointer 41, rather than changes in its position, so that applying a constant tangential pressure on the soap drives pointer 41 in a corresponding direction, and releasing tangential pressure on the soap causes pointer 41 to stop, similar to the input mode typical of a joystick input device. In yet another mode of use or another embodiment, changes in the position of the optical sensor 17 relative to its reference surface may determine a scrolling of the view on monitor 40 up and down or left and right, similar to the input mode typical of a scrolling dial on a mouse.

In the illustrative embodiment of FIG. 6, the user is able to use soap 10 from a significant displacement from the computing device associated with user interface monitor 40, and wireless transmitter 33 has a range long enough to reliably transmit user input signals from soap 10 from across a room and over substantially longer distances. Other embodiments are not limited to the illustrative example of a wireless transmitter, and may include a wired transmission line that may be connected between soap 10 and the associated computing device.

A variety of mechanisms may be used in different embodiments of a soap to indicate a user selection input, analogous to clicking a button on a mouse, as is commonly done to select or "click on" an icon, a link, or another graphical object on which a pointer 41 is positioned. For example, soap 10 may include an input mechanism for indicating a user selection input that includes pressure sensors 27 of soap 10. Whereas the directional input is indicated by applying tangential pressure to rotate the core 21 with respect to its reference surface, pressure sensors 27 are activated by applying perpendicular, non-tangential pressure to soap 10. This can take the form of pressing a single pressure sensor 27, so that it functions as a sub-surface button; or of applying pressure more generally to soap 10 such as by squeezing it.

In one embodiment, different pressure sensors 27 may serve as distinct buttons for indicating separate user input functions, such as to correspond to typical "left-click" and "right-click" distinctions assigned to left and right buttons on a traditional mouse. In an illustrative embodiment, one or more pressure sensors 27 may also include features that assist in locating them through the intervening layer or layers of the soap. For example, pressure sensors 27 may be distinctly raised, or they may have associated lights that are visible through the layer or layers. Pressure sensors 27 thereby provide a means for detecting substantially perpendicular, non-tangential pressure on the core 21, to indicate a user selection input. Such selection inputs, like the pointer position inputs determined by manipulation of the position of the optical sensor relative to its reference surface, may be transmitted to a computing device via wireless transmitter 33. Many other types of selection input devices may be used, such as a tilt sensor that the user activates by flicking the soap, or a microphone that activates by the user tapping the soap, or a button on a separate device, for example.

While the pressure sensors 27 have been indicated in certain positions in the illustrative embodiment of FIGS. 2 and 3, other embodiments are not limited to this illustrative example. Other pressure sensors, buttons, or other user selection input mechanisms may be located anywhere on soap 10, in other embodiments. A separate button-pad or other selection input mechanism separate from soap 10 is also possible, in other embodiments.

Depending on details of configuration such as viscosity of lubricant 15, flexibility or elasticity of first hull 17 and second hull 13, and sensitivity of pressure sensors 27, it may be difficult for a beginning soap user to apply a perpendicular pressure to indicate a selection input, without applying an inadvertent component of tangential pressure, which would drive a change in position of pointer 41. In this case, it might therefore be difficult to reliably "click on" or select an intended icon, link or other graphical object with pointer 41 without at the same time disturbing the position of pointer 41, potentially repositioning the pointer 41 to an unintended position at the point in time in which the "select" input is received. While this is not likely to be noticeable in uses such as clicking on an icon in a graphical user interface, this may become a particularly urgent issue in applications in which it becomes critically important to make selections with the pointer 41 as rapidly and precisely as possible, such as in teleoperation of mechanical devices or in a computer game. A number of solutions may be used to resolve this issue, such as those described below.

In one illustrative embodiment, for example, the friction profile and other mechanical characteristics of the soap components may be optimized to ensure that users are reliably, quickly and intuitively able to engage positioning control and selection control independently, with a high degree of speed and precision.

In yet another example, which may be combined with the previous ones, a signal processing solution may be applied. For example, whenever the pressure sensor or another means for indicating a selection input is engaged, processor 31 or a processor in an associated computing device may reverse a brief time segment of the signal from the tracking component, before the user selection input is indicated. That is, the processor or executed software may back up the pointer 41 to the position it occupied a small segment of time before the user selection input was received, the segment of time corresponding to the typical gap in time, if any, between a user beginning a hand motion to engage the selection input, and the selection input being transmitted, thereby canceling out the effect of any intervening disturbance of the position of the tracking component. That gap in time, if it occurs at all, is typically in the general range of a tenth of a second to a hundredth of a second.

In other embodiments, a soap is not limited to controlling the position of a pointer on a graphical user interface as in the illustrative embodiment described above. A soap may be used as a user input device for any kind of computing device. As another illustrative example, a soap may be used analogous to a remote control for a video display, a game controller for a computer game, or a playback controller for a music player device, for example. Other embodiments are also not limited to an independent core that is rotatable about two axes within a hull. In another illustrative embodiment, a core is partially enclosed by a cylindrical, conveyor belt type hull that wraps snugly around it, such that the core is free to move back and forth about only a single axis.

Other embodiments are also not limited to an optical sensor, but may have a mechanical position sensor or any other kind of tracking component. In other embodiments, the core can also take any kind of shape that is capable of being turned or rotated by an application of shear or tangential pressure through a surrounding hull, such as by a one-handed rolling or kneading motion. Different embodiments having a core shaped like a kidney or a lentil, or an oblate spheroidal or prolate spheroidal shape in general, have proven to be particularly suitable for this purpose. In other embodiments, a single hull may also serve as the only component that partially encloses the core 21.

Figure 7:
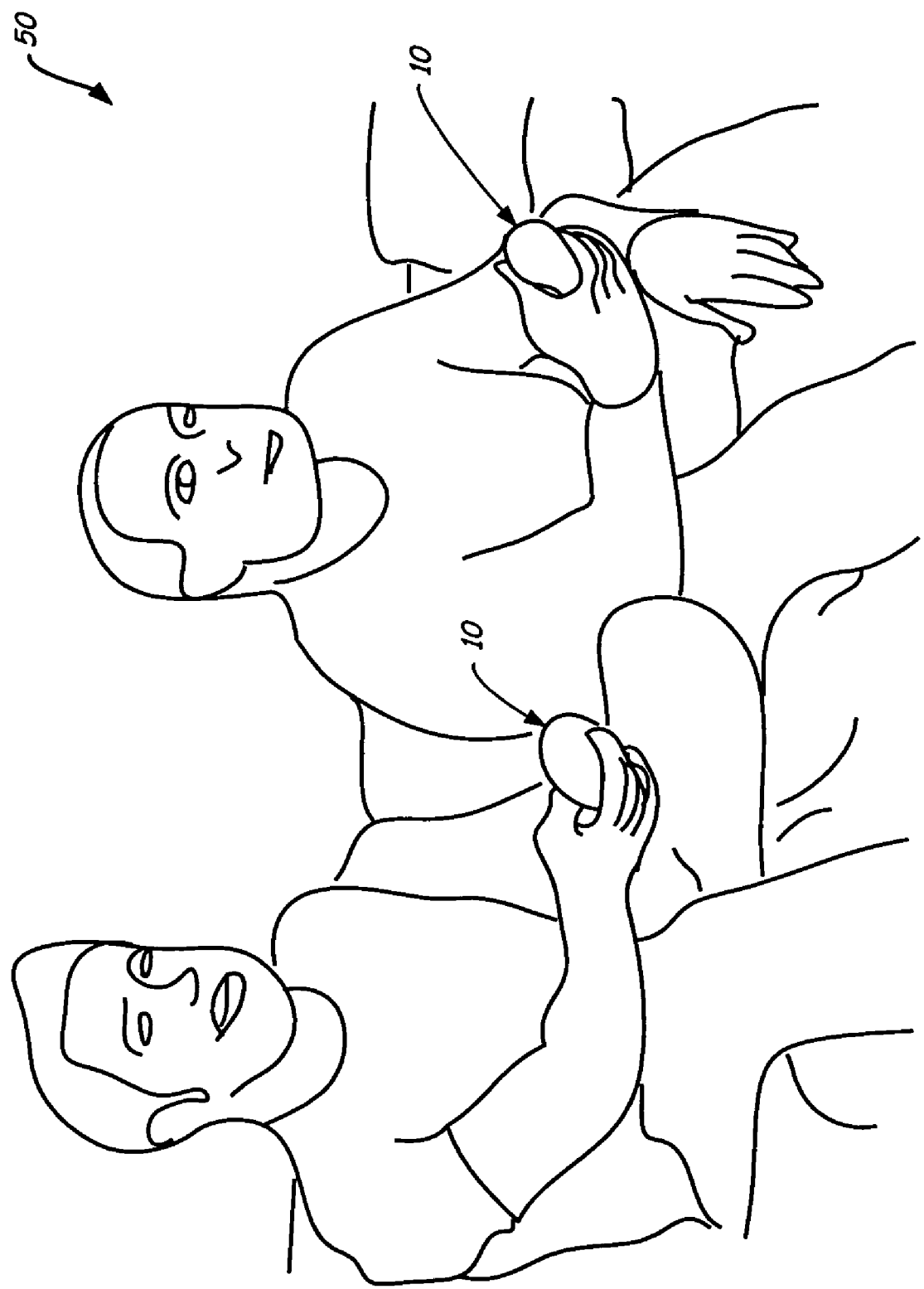
FIG. 7 depicts a perspective view of two soap devices in use, according to an illustrative embodiment.

A soap therefore provides an extremely convenient and powerful user input device with many benefits. Due to the softness and cushioning inherently provided by the layers around the core, the soap 10 is durable and rugged. It is self-contained; a user can use it with one hand in midair, without having to confine its use to an external reference surface such as a mousepad, and the user can easily stash the soap anywhere, such as a pocket, and take it anywhere, without having to worry about disconnecting or reconnecting any wired connections. FIG. 7 depicts this advanced ease-of-use in context, with two users relaxing on a couch while using their soaps 10 to play a computer game on a wall-mounted monitor across the room such as monitor 40 of FIG. 6.

The soap enables the user to use the full dexterity available of manipulating an object between one's thumb and other fingers, a more natural, ergonomic, and precise manner of manipulating an object than is provided by traditional user input devices. In addition, a soap is pleasing to use. It has been found to be fun and relaxing to manipulate in one's hand for its own sake, analogous to a stress ball, aside from any usage as a computing input device. The outer hull 11 of a soap may also have any of a wide variety of textures that are pleasing to the touch, including textures that are cottony, downy, fleecy, fluffy, furry, fuzzy, satiny, silky, velvety, or woolly, for example. The flexibility and softness of first hull 17 and second hull 13, and the viscosity of lubricant 15, along with any other cushioning or mechanical factors introduced, may also be selected to maximize the tactile enjoyment of a soap 10. A soap 10 therefore provides utility as a recreational, hand massage, and stress relief device.

The outer hull 11 of a soap may also be removable and interchangeable, so that a user can vary between different outer hulls with a variety of different textures. The different outer hulls may also have different decorative styles and patterns, and may provide interest as collectible items, as advertising, marketing or promotional items, or as status symbols, analogous to cell phone covers.

In some of the illustrative embodiments discussed above, soap 10 includes a liquid layer of lubricant 15, between an inner, first hull 17 and a second hull 13 that provide a liquid-proof seal to ensure that the lubricant 15 remains isolated from the core 21 and from the exterior of soap 10. Power component 25 is included with core 21 in the illustrative embodiment of FIGS. 2 and 3. In one illustrative embodiment, a wired power connection may be included between power component 25 and the exterior of soap 10, that runs through a protected duct through lubricant 15, for recharging power component 25. In other embodiment, power component 25 may be optimized to have an expected lifetime similar to that of the soap 10 as a whole, so that power component 25 does not need recharging during the expected operating lifetime of a single soap 10. In yet another illustrative embodiment, power component 25 includes an inductive charging mechanism, configuring it to receive power by inductive charging, so that its power reservoir may be recharged without a direct connection. A soap 10 may then periodically be deposited onto an inductive recharging cradle, which recharges power component 25.

Because of its axial symmetry in the embodiment of FIGS. 2 and 3, soap 10 may have different orientations relative to its pointer position control consistent with the same outward appearance; i.e. a user first picking up a soap 10 may not know whether its core is oriented forward or backward, and the pointer position control may have a mirror image response depending on which way is which on the soap 10. The orientation of the soap 10 relative to its pointer positioning control may be discovered with the briefest initial functional usage of the soap 10, and a user may then flip the soap around to use in the orientation desired by the user. In one illustrative embodiment, the need for even this brief feedback is eliminated by including an orientation sensor, such as a tilt sensor, within soap 10, and automatically reprocessing its position signals depending on the orientation indicated by its orientation sensor.

Figure 8:
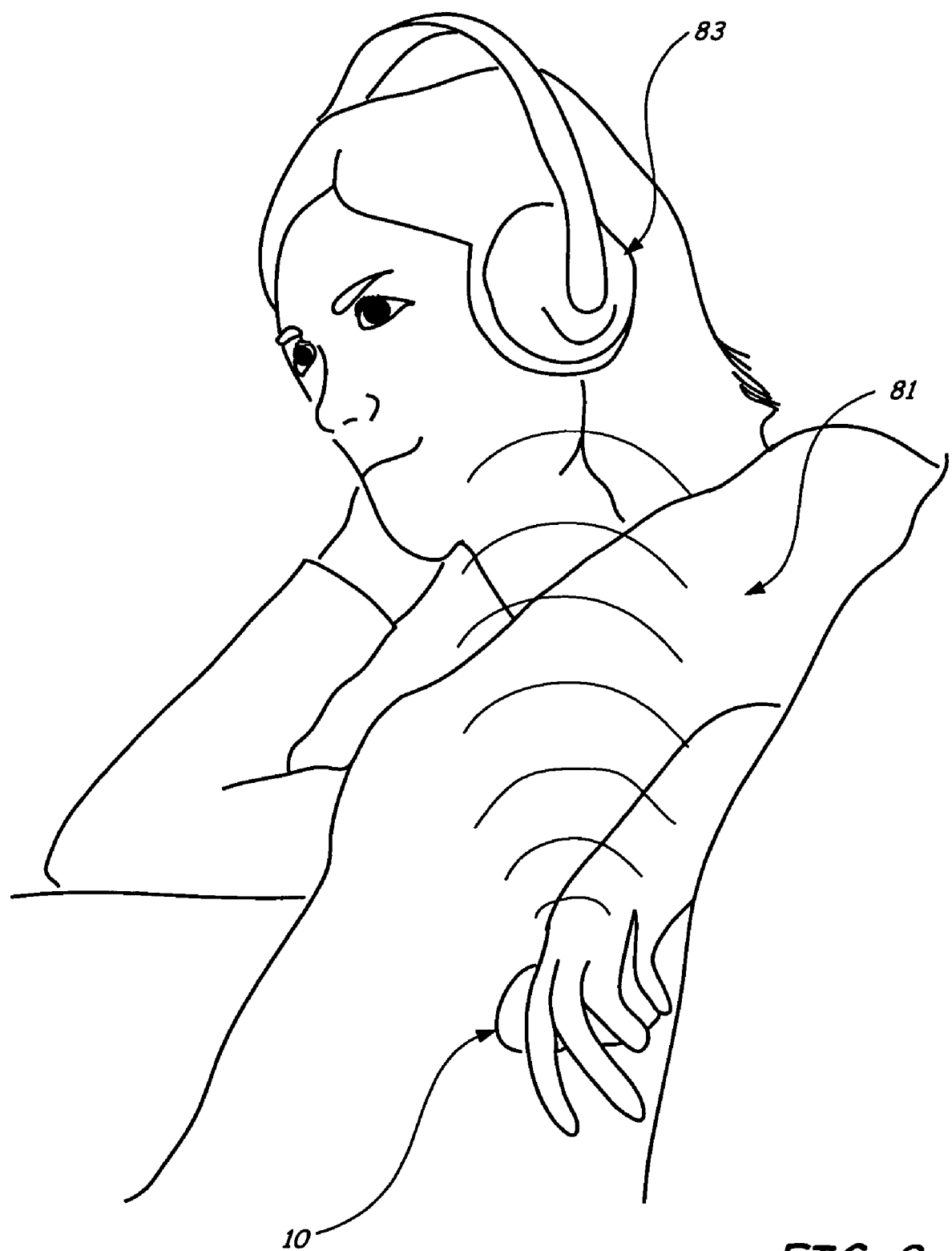
FIG. 8 depicts a perspective view of a soap device with internal device in use, according to an illustrative embodiment.

FIG. 8 depicts a perspective view of a soap device 10 with an internal device in use, according to an illustrative embodiment. In this particular embodiment, soap 10 includes a radio and music file player. The user's manipulation of the hull and core of soap 10 are therefore translated into control signals that are provided as output to an electronic device which is internal to soap 10 in this illustrative embodiment, where the internal device is the radio and music file player. The radio and music file player may in turn transmit audio files via wireless signal 81 to the user's headphones 80, as in this particular example; such a soap 10 may also be used to plug into headphones or another external audio device by a wired connection, or may contain internal speakers as part of the internal electronic device, so that nothing is emitted from the soap 10 other than the sounds of the ultimate audio playback. The user manipulation of the hull relative to the core may control a shuffle function, skipping forward to the next audio file for one direction or back to the previous start of an audio file for the reverse direction, for example, while a simple squeeze of the soap 10 may provide the signal to start or stop playback of the audio files, in one illustrative example. Other implementations are not limited to this example, and may involve providing signals to any other type of device, internal or external.

Figure 9:
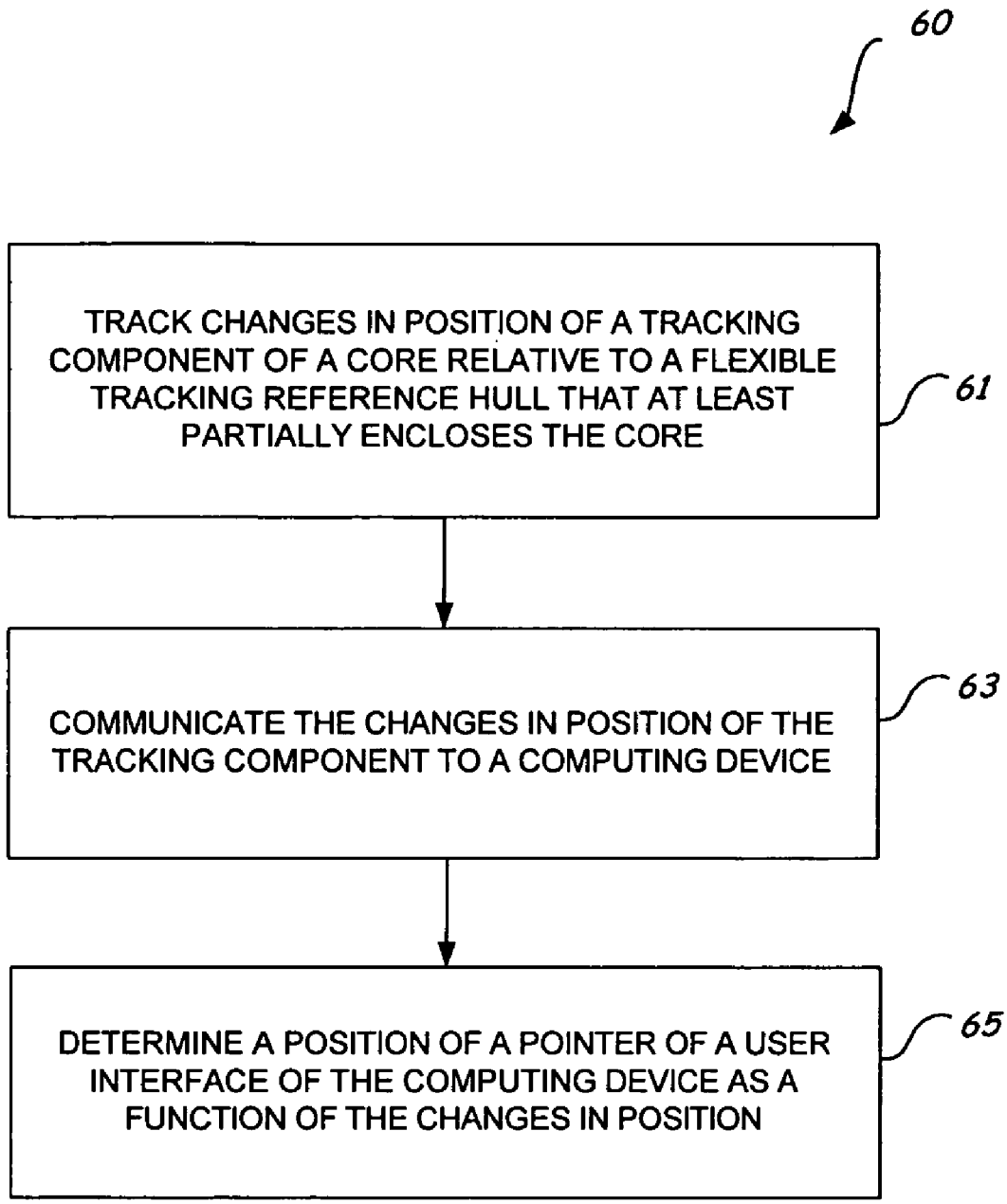
FIG. 9 depicts a block diagram of a flowchart for a method performed with a soap device, according to an illustrative embodiment.

FIG. 9 depicts a brief block diagram of a flowchart for a method 60 performed with a soap input device, according to an illustrative embodiment. Method 60 includes step 61, to track changes in position of a tracking component, such as optical sensor 17, of a core, such as core 21, relative to a flexible tracking reference hull, such as outer hull 11, that at least partially encloses the core; step 63, to communicate the changes in position of the tracking component to a computing device; and step 65, to determine a position of a pointer, such as pointer 41, of a user interface, such as the graphical user interface provided on monitor 40, of the computing device as a function of the changes in position of the tracking component.

Various embodiments may run on or be associated with a wide variety of hardware and computing environment elements and systems. A computer-readable medium may include computer-executable instructions that configure a computer to run applications, perform methods, and provide systems associated with different embodiments. Some illustrative features of exemplary embodiments such as are described above may be executed on computing devices such as computer 110 or mobile computing device 201, such as depicted in FIGS. 10 and 11.

Figure 10:
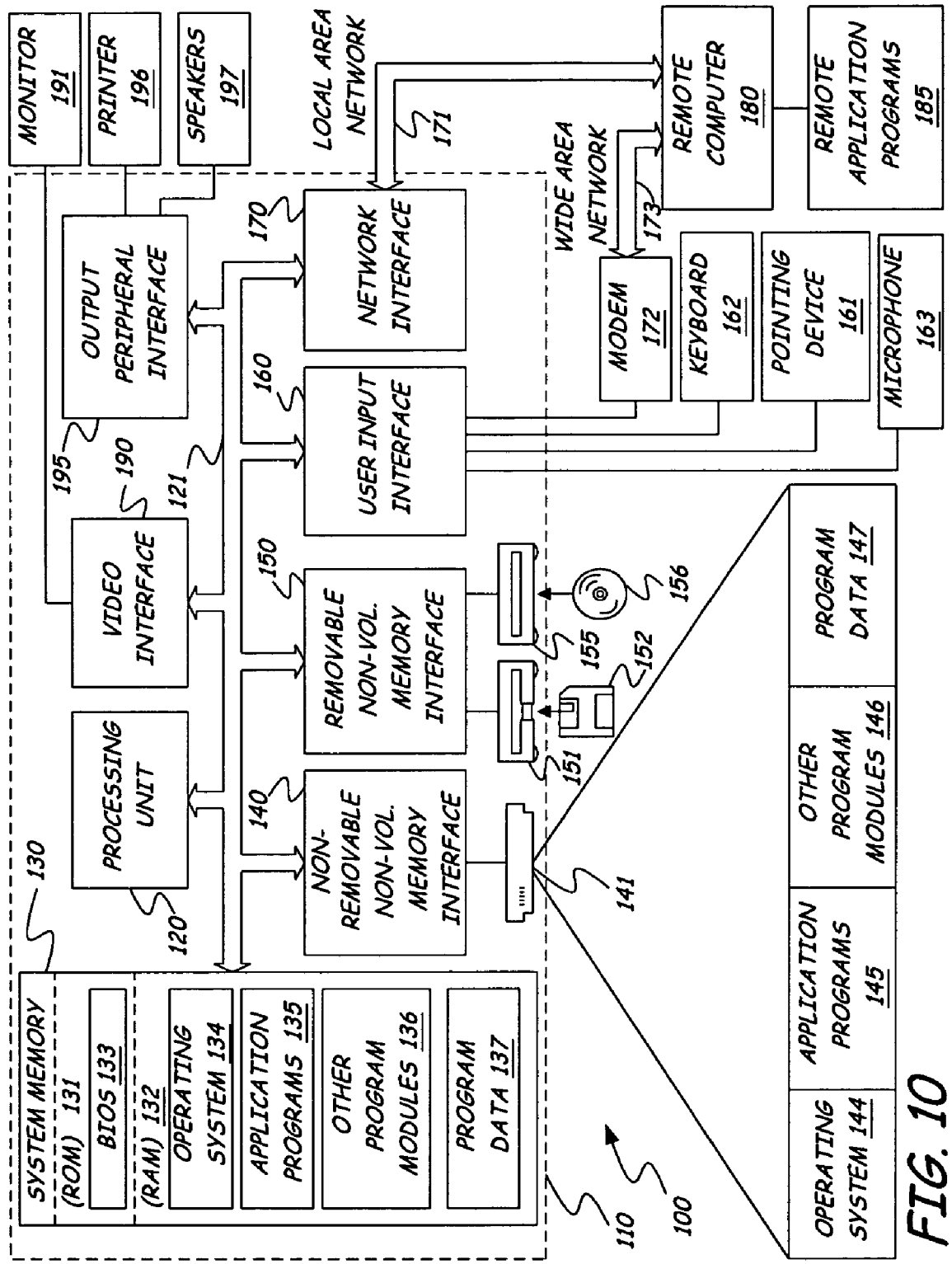
FIG. 10 depicts a block diagram of a general computing environment, comprising a computer and a medium readable by the computer, and comprising executable instructions that are executable by the computer, according to an illustrative embodiment.
Figure 11:
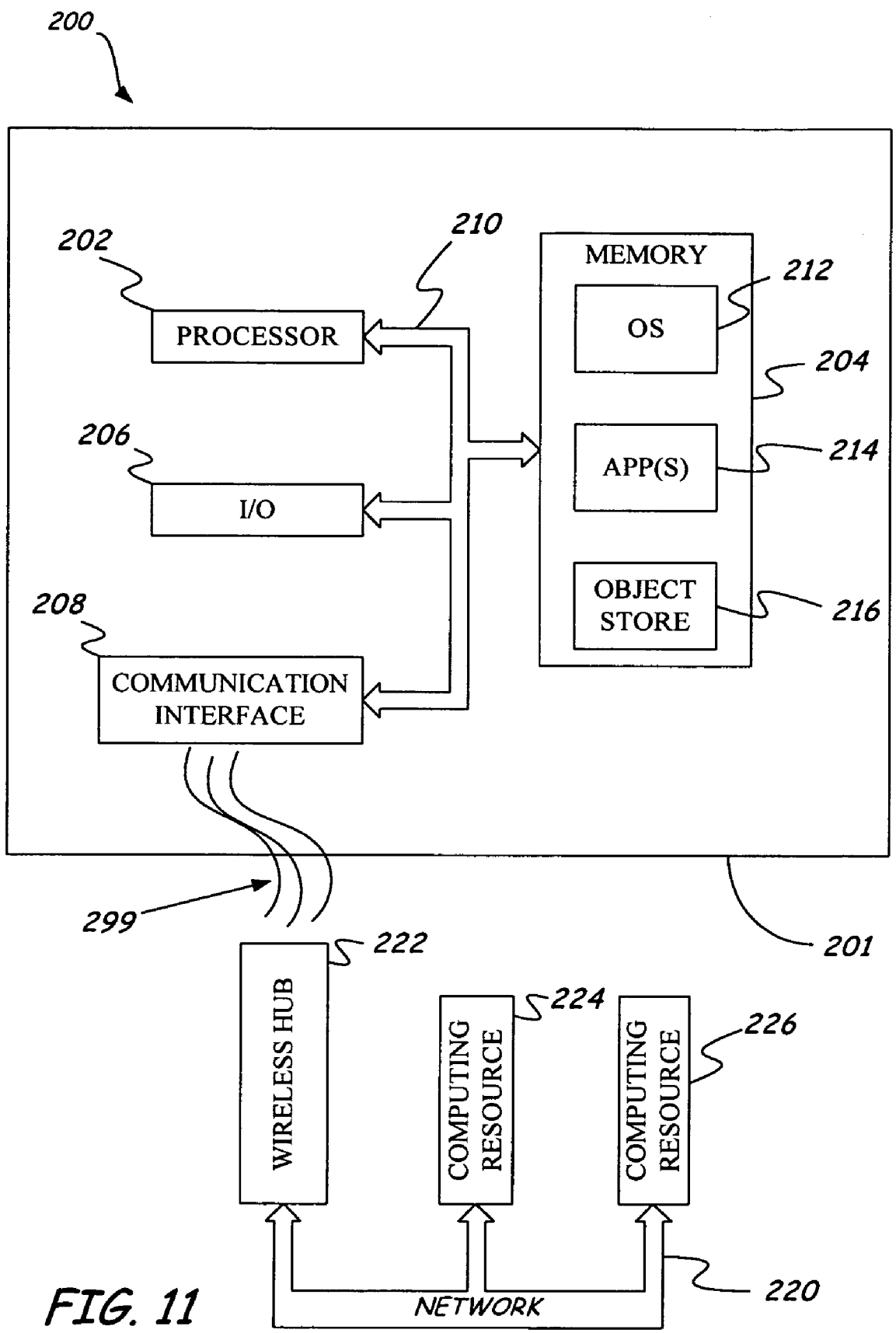
FIG. 11 depicts a block diagram of a general mobile computing environment, comprising a mobile computing device and a medium readable by the mobile computing device, and comprising executable instructions that are executable by the mobile computing device, according to an illustrative embodiment.

FIG. 10 depicts a block diagram of a general computing environment 100, comprising a computer 110 and various media such as system memory 130, nonvolatile magnetic disk 152, nonvolatile optical disk 156, and a medium of remote computer 180 hosting remote application programs 185, the various media being readable by the computer and comprising executable instructions that are executable by the computer, according to an illustrative embodiment. FIG. 10 illustrates an example of a suitable computing system environment 100 on which various embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Various embodiments may be implemented as instructions that are executable by a computing device, which can be embodied on any form of computer readable media discussed below. Various additional embodiments may be implemented as data structures or databases that may be accessed by various computing devices, and that may influence the function of such computing devices. Some embodiments are designed to be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable volatile/nonvolatile computer storage media. By way of example only, FIG. 10 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10, provide storage of computer readable instructions, data structures, program modules and other data for the computer 110. In FIG. 10, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may be operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 10 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on remote computer 180. It will be appreciated that the network connections shown are exemplary and other means of establishing a communications link between the computers may be used.

FIG. 11 depicts a block diagram of a general mobile computing environment, comprising a mobile computing device and a medium, readable by the mobile computing device and comprising executable instructions that are executable by the mobile computing device, according to another illustrative embodiment. FIG. 11 depicts a block diagram of a mobile computing system 200 including mobile device 201, according to an illustrative embodiment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212, in one illustrative embodiment, is a WINDOWS® CE brand operating system commercially available from Microsoft Corporation. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Mobile computing system 200 also includes network 220. Mobile computing device 201 is illustratively in wireless communication with network 220—which may be the Internet, a wide area network, or a local area network, for example—by sending and receiving electromagnetic signals 299 of a suitable protocol between communication interface 208 and wireless interface 222. Wireless interface 222 may be a wireless hub or cellular antenna, for example, or any other signal interface. Wireless interface 222 in turn provides access via network 220 to a wide array of additional computing resources, illustratively represented by computing resources 224 and 226. Naturally, any number of computing devices in any locations may be in communicative connection with network 220. Computing device 201 is enabled to make use of executable instructions stored on the media of memory component 204, such as executable instructions that enable computing device 201 to receive user input signals via a soap 10, and to enable those signals to control the positioning of a pointer and selection of icons and other graphical objects with the pointer, on a monitor displaying a graphical user interface.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
    a core;
    a transparent, flexible first hull that completely encloses the core;
    a transparent, flexible second hull that completely encloses the first hull;
    a transparent lubricant disposed between the first hull and the second hull;
    an opaque, flexible, removable outer hull, completely enclosing the second hull;
    a tracking component, disposed on the core and configured to track movement of the core relative to one or more of the first hull, the second hull, or the outer hull, in which the tracking component comprises an optical sensor having a focal length at least equal to a distance between the optical detector and the outer hull; and
    an output component, disposed on the core and configured to output a signal from the tracking component to an electronic device.

2. The device of claim 1, wherein the core has a longer dimension in one axis than in a second axis perpendicular to the first axis, enabling a tangential pressure applied through the first hull to freely rotate the core relative to the first hull.

3. The device of claim 1, wherein the tracking component comprises an optical sensor.

4. The device of claim 1, wherein the signal determines a change in position of a pointer on a monitor.

5. The device of claim 1, wherein the signal determines a change in velocity of a pointer on a monitor.

6. The device of claim 1, wherein the signal determines a scrolling of a view on a monitor.

7. The device of claim 6, wherein the device is configured to enable the scrolling to be performed indefinitely with an uninterrupted motion.

8. The device of claim 1, further comprising an input mechanism indicating a user selection input, wherein the transmission component is further configured to transmit a signal indicating the user selection input to the electronic device.

9. The device of claim 8, wherein the input mechanism indicating a user selection input comprises a means for detecting substantially non-tangential pressure on the core.

10. The device of claim 8, further comprising a means for reversing a time segment of the signal from the tracking component, after a user selection input is indicated.

11. The device of claim 8, wherein the input mechanism indicating a user selection input comprises a tilt sensor.

12. The device of claim 1, in which the transmission component comprises a wireless transmitter.

13. The device of claim 1, in which the tracking component comprises an LED.

14. The device of claim 1, further comprising a power component configured to provide power to the tracking component and to the transmission component, and configured to receive power by inductive charging.

15. A device comprising:
    a transparent, flexible first hull;
    a freely rotatable spheroidal core disposed within the hull, in which the spheroidal core comprises a tracking component configured to generate a tracking signal as a function of a change in position of the tracking component relative to the hull, and in which the hull is sufficiently soft to enable a user to press the hull against the core;
    a transparent, flexible second hull that completely encloses the first hull;
    a viscous lubricant disposed between the first hull and the second hull;
    an opaque, flexible, removable, fuzzy outer hull, completely enclosing the second hull;
    one or more pressure sensors disposed on the core; and
    an output component, disposed on the core and configured to output a signal from the tracking component to an electronic device, including both a directional signals from the tracking component, and an indication signal from the one or more pressure sensors.

16. The device of claim 15, the device further comprising a communicative component capable of communicating the tracking signal to a graphical user interface of an electronic device.

17. A method comprising:
    tracking changes in position of a tracking component of a core relative to a flexible tracking reference hull that completely encloses the core with at least two intervening flexible, transparent hulls between the core and the flexible tracking reference hull;
    tracking actuation of one or more pressure sensors disposed on the core;
    communicating the changes in position of the tracking component and actuation of one or more pressure sensors to an electronic device;
    determining a position of a pointer of a graphical user interface of the electronic device as a function of the changes in position of the tracking component; and
    determining selections with the pointer in the graphical user interface of the electronic device as a function of the changes in position of the tracking component.

* * * * *